United States Patent [19]

LeBouder

[11] 4,237,371
[45] * Dec. 2, 1980

[54] ROTARY MACHINE ELECTRONICS SUPERVISORY AND CONTROL APPARATUS

[75] Inventor: Maurice LeBouder, Nimes, France

[73] Assignee: Fernotex Fernost-Testihandel, Austria

[*] Notice: The portion of the term of this patent subsequent to May 1, 1996, has been disclaimed.

[21] Appl. No.: 894,898

[22] Filed: Apr. 10, 1978

Related U.S. Application Data

[63] Continuation-in-part of Ser. No. 692,316, Jun. 3, 1976, Pat. No. 4,152,580.

[30] Foreign Application Priority Data

Jun. 20, 1975 [FR] France .............................. 75 20181

[51] Int. Cl.³ .............................................. G07C 3/04
[52] U.S. Cl. ............................ 235/92 PD; 235/92 T; 235/92 FQ

[58] Field of Search ........ 235/92 FQ, 92 PD, 92 CT, 235/92 MS, 92 T, 92 NT, 92 FP, 103

[56] References Cited

U.S. PATENT DOCUMENTS

| | | | |
|---|---|---|---|
| 3,510,632 | 5/1970 | Strandberg | 235/92 PD |
| 3,686,484 | 8/1972 | Ciemochowski | 235/92 FQ |
| 3,793,512 | 2/1974 | Lorenzen | 235/92 PD |
| 4,071,892 | 1/1978 | Genzling | 235/92 FQ |

Primary Examiner—Joseph M. Thesz
Attorney, Agent, or Firm—Lewis H. Eslinger

[57] ABSTRACT

An apparatus for supervising the operation of a rotary machine, such as a heat engine driving an electric generator, pump, etc., includes electronic circuits responsive to the alternating output of a tachometer-type alternator for recording performance details, such as speed, running hours, running hours in excess of normal speed, running hours with improper parameters (oil pressure, water pressure, or temperature), these electronic circuits being powered by rectifying the alternator output.

6 Claims, 3 Drawing Figures

ROTARY MACHINE ELECTRONICS SUPERVISORY AND CONTROL APPARATUS

CROSS-REFERENCE TO RELATED APPLICATION

This application is a continuation-in-part of U.S. patent application Ser. No. 692,316, filed June 3, 1976, now U.S. Pat. No. 4,152,580, and having a common assignee herewith. The disclosure of said application is incorporated herein by reference as if fully set forth herein.

BACKGROUND OF THE INVENTION

1. Field of the Invention

This invention relates to electronic supervisory and control apparatus for rotary machines.

High-power rotary machines, for example heat engines driving ships, generator sets, pumps and so on, require systematic control of certain operating parameters of which the values must not exceed certain limits, for example, the temperature, the pressure of oil or of cooling water, or the speed in the case of heat engines.

In the case of breakdown it is of great interest to have a record of the number of operating hours of the machine and in particular a selective record of the running hours or number of rotations under abnormal operating conditions. Such records allow responsibility to be established in the case of breakdown and permit certain defects to be remedied.

In addition, it is of interest to automate the starting operations of heat engines, that must be commanded in sequence at exact times, as well as the procedures for emergency stopping in case of a defect, or for a normal stop.

2. Description of the Prior Art

At present the surveillance of heat engines is carried out by means of indicators or recorders for speed, running tests, or of the values of some parameters, such as water or oil pressure or temperature, but there does not exist selective recording means retaining in a memory for example the number of operating rotations under certain abnormal conditions, so that in case of dispute as to the cause of a breakdown it is necessary to examine a large number of daily records, if they exist, to try to reconstitute the history of the machine.

As regards automation of starting or of stopping, these are generally effected by means of expensive circuits and relays contained in bulky equipment cabinets. In practice, each cabinet is hand wired in order to include the automation circuits shown on the basic diagram. This necessitates relatively long lead times in manufacture, high charges for transport and handling of the equipment cabinets and difficulties in adjustment during the initial setting-up and also for removing faults or "debugging" of the automation electronics cabinets, which debugging can only be effected by qualified technicians.

On the other hand the existing apparatus for control and recording and the present automation electronics cabinets consume a relatively large amount of energy which is taken initially from the mains or from a relatively high-power alternator driven by the machine.

Lastly, the existing arrangements require several movement sensors on the rotary machine to drive the tachymetric indicators and running-hour counters.

The object of the present invention is to provide electronic control arrangements for rotary machines that are much simpler than existing arrangements, of small bulk, may be mass-produced, are self-contained, require only a single movement sensor and allow the instantaneous speed to be known and also the recording of the total number of working rotations and the selective recording of the number of working rotations in different abnormal conditions and possibly combining several anomalies and which may automatically and sequentially control the starting and stopping operations.

Electronic arrangements for the control of a rotary machine are already known that comprise a low-power tachometer alternator driven by the machine, electronic shaping circuits connected to the alternator output which transform the alternating voltage supplied by the latter into rectangular impulses of constant duration, of which the frequency is proportional to that of the alternator, and electronic measuring circuits which count and record the rectangular pulses delivered per unit time (speed) and during predetermined periods (total operating time or time in over-speed or under abnormal conditions).

The object of the invention is achieved by means of an arrangement comprising in addition a rectifier connected to the alternator output which supplies the electronic circuits with low-voltage direct current.

Preferably, the arrangement further comprises a secondary battery which is connected in parallel with the rectifier output and the electronic circuits, and which ensures the supply of direct current to the electronic circuits during starting of the rotary machine. It is known to provide a battery which supplies power during periods when the alternator is not supplying sufficient output (such as idle or start-up of the rotary machine), and which charges or "accumulates" during periods of normal operation of the alternator.

It is also known to provide a rotary machine with circuits for selectively counting the number of machine rotations under abnormal conditions, for example with too-low oil or water pressure or above a predetermined speed.

In an arrangement in accordance with the invention, each selective counter circuit consists of at least one sensor, placed on the rotary machine, which automatically actuates a movable contact when an operating anomaly appears, and of a logic gate having several inputs. A first input of the gate is connected by way of a frequency divider to the output of the circuits for shaping the alternating voltage and the other inputs are each connected to one of the movable contacts while the gate output is connected to a pulse counter.

An apparatus in accordance with the present invention further comprises selective counter circuits for counting the number of operating rotations above a certain speed, which consist of a logic gate having an output that is connected to a pulse counter and at least two inputs of which one is connected to the output of a pulse integrator circuit.

An apparatus in accordance with the present invention may additionally comprise circuits for automatically controlling the starting and stopping connected to outputs of frequency counters so that they control these operations sequentially.

The result of the invention is a novel circuit which forms a control apparatus for rotary machines. The advantages of this apparatus are as follows:

It is entirely contained in a unit of small bulk and of lightweight, which may be sealed, e.g., by soldering, and therefore be made tamper-proof.

It is self-contained and does not require any external source of supply—in fact its consumption is very low, of the order of a few watts, and a very small permanent magnet tachometer alternator having a power of 10 to 20 watts is sufficient to supply the energy necessary for the control apparatus. A small dry battery having a capacity of a few ampere-hours is sufficient to store the energy necessary to feed the control circuits during the starting process. Power consumption when the machine is stopped may readily be avoided by means of a relay that, during stoppages, automatically isolates the control circuits that are not in use. Lastly, if the controlled machine is likely to remain idle for long periods, for example, if it is a heat engine intended to drive an emergency generator set in case of power failure, it is simple to connect to the mains a charger providing a continuous charge for the battery.

An important advantage of an arrangement in accordance with the invention lies in the fact that it allows all the functions of supervision, of recording and of automation, which were formerly obtained by means of indicating and recording apparatus and complex relay systems installed in specially wired control and automation cabinets, to be carried out simply and at relatively low cost. The invention likewise permits simple selective recording combining several parameters, for example recording of the total number of operating revolutions, at a speed higher than 1000 r.p.m. with an oil pressure lower than a given value and a cooling-water temperature above a threshold level.

Such separate recordings of the more serious operating anomalies are very useful in case of breakdown to determine the true cause of the breakdown and to remedy it and likewise to establish the division of responsibility between manufacturer and user.

These selective recordings are obtained simply by combining, by means of logic gates, different items of information available in the arrangement, which allows selection, at no additional cost, of recordings appropriate to different machines while using arrangements that are largely identical.

Another advantage lies in the fact that it is possible to mass produce units containing all the circuits common to all the units. The battery and the circuits for charging it from the alternator (rectifier, transformer), circuits for pulse shaping, voltage dividers, counters, logic gates, connections for all the sensors placed on the machine can be mass produced using known techniques. It is then necessary only to modify certain connections to the inputs of the logic gates to obtain selective records corresponding to the particular application. Arrangements in accordance with the invention are therefore very flexible in application. On the other hand, as their cost and the charges for installation and wiring-up are reduced, it is possible to contemplate the replacement of one entire unit by another in case of breakdown or even for preventive maintenance, which considerably reduces the cost of maintenance and of repair.

Another advantage of circuit arrangements in accordance with the present invention is that the pulses from the frequency dividers after each starting of the rotary machine provide a running count proportional to the number of rotations made by the rotary machine. These pulses may readily be used for automatically and sequentially controlling the various phases of starting or of automatic delayed stopping of the machine, as well as sequentially putting the different safety devices into service at the required moments.

The following description refers to the drawings and represents by way of example an embodiment of an arrangement in accordance with the present invention.

Figure 1:
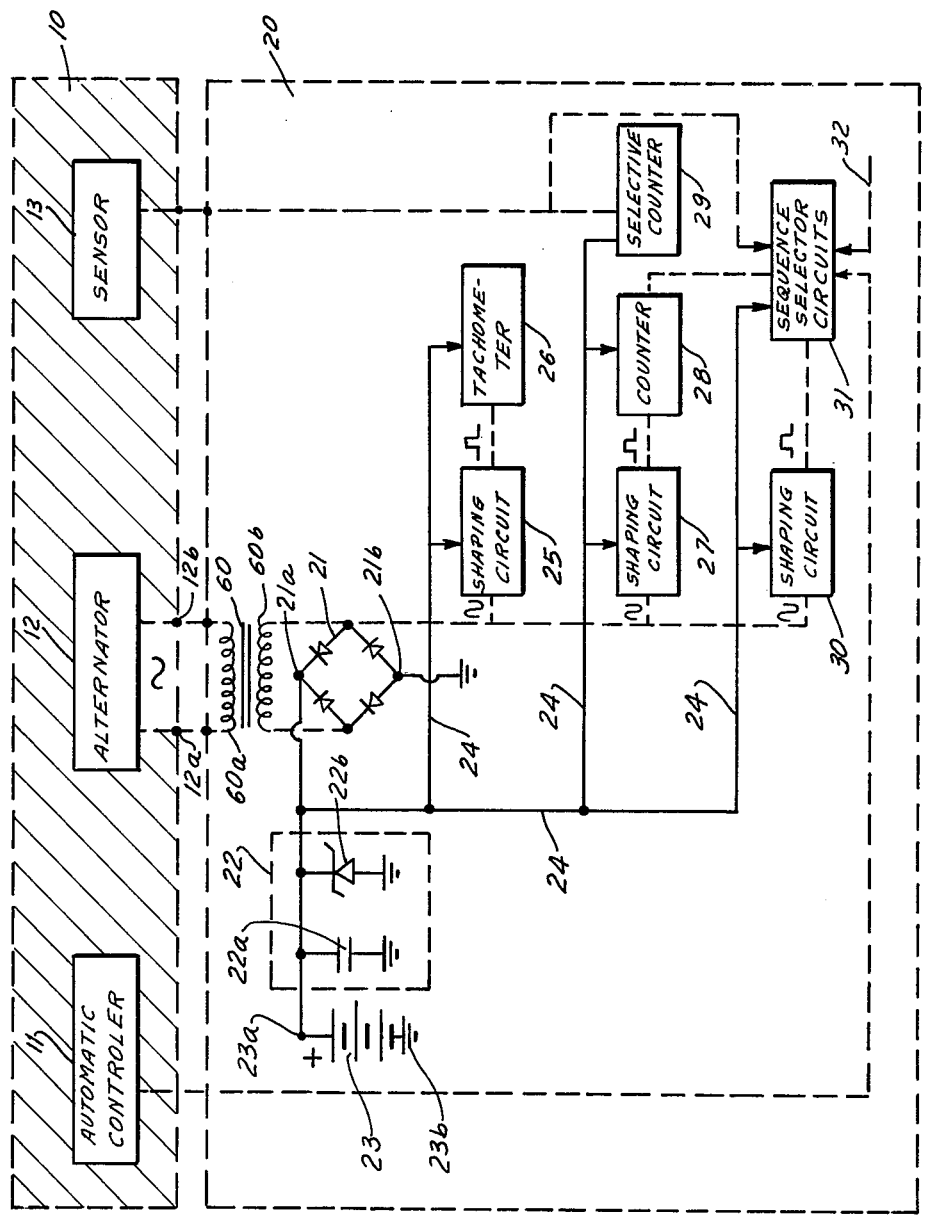
FIG. 1 is a schematic diagram of an overall circuit arrangement according to the present invention.

Referring initially to FIG. 1 of the drawings, the supervisory apparatus 20 according to this invention is connected to a rotary machine 10, here shown in block form. The shaded rectangle 10 represents a rotary machine, for example a heat engine, whose operation it is desired to control. The broken-line rectangle 20 represents a housing in which the electronic circuits in accordance with the invention are situated.

The machine 10 drives a small permanent-magnet tachometer alternator 12, for example, an alternator that supplies at its outputs 12a, 12b a no-load voltage of 125 volts at a frequency of 200 Hz when it rotates at 1000 r.p.m. The outputs 12a and 12b are connected to the primary coil 60a of a transformer 60. The secondary coil 60b of the transformer 60 supplies a low voltage, for example 12 volts. Secondary coil 60b is connected to a rectifier 21, for example a bridge composed of four diodes. The rectifier supplies a DC output across its outputs 21a and 21b. As shown, one of the outputs 21b is connected to common. The other output 21a is connected to a voltage regulator 22 of conventional construction, comprising for example a capacitor 22a and a zener diode 22b, so that the DC voltage delivered by the rectifier is steady.

Output 21a of rectifier 21 is connected through conductors 24 to all the electronics circuits and components of the device 20 for supplying the circuits and components with low voltage direct current.

Preferably, a small accumulator 23 may be connected to the output of rectifier 21 in parallel with the rectifier and with the supply conductors 24. The accumulator 23 is typically composed of several elements forming a storage battery. The accumulator 23 can be for example of the dry-battery type having a capacity of several ampere-hours. One terminal 23a of the accumulator is thus connected to rectifier output 21a, and the other terminal 23b to common. Such an association of a rectifier 21, a voltage regulator 22, and a battery 23 is well known in the electrical arts.

Thus, the apparatus 10, 20 is self-contained. During periods of operation of rotary machine 10, the amount of energy provided by alternator 12 exceeds the consumption of energy by the electronics circuits. The accumulator 23 acts to store the excess energy. During idle and start-up operations, the energy stored in accumulator 23 is supplied to the electronics circuits.

In either the case of active operation, or the case of idle or start-up, it is the AC voltage produced from the alternator 12, transformed by transformer 60, and rectified by rectifier 21, that directly or indirectly supplies the DC current for feeding the electronics circuits of device 20.

Nevertheless, while an apparatus comprising a battery or accumulator 23 is a preferred embodiment of the invention, such battery or accumulator is not critical to the invention. The apparatus will in fact operate satisfactorily without the battery 23.

The rotary machine 10 comprises control devices 11 which automatically control starting, normal stopping, and emergency stopping. Rotary machine 10 likewise comprises detectors or sensors 13 which monitor certain parameters of the operation independent of the speed, for example, sensors for the pressure and temperature of the oil or of the coolant.

The supervisory apparatus 20 is a unit of small bulk and light weight, on the order of forty-five pounds. The supervisory apparatus contains a tachymetric recording chain 25, 26, a working-hour recording chain 27, 28, 29, and a sequence selector chain 30, 31. The tachymetric chain comprises a wave shaping circuit 25 and a tachometer circuit 26. Tachymetric wave shaping circuit 25 is connected to the alternator output, and provides rectangular signals in response to the waves of alternating current supplied by the alternator 21. A tachometer circuit 26 is connected to the output of wave shaping circuit 25. Tachometer circuit 25 then measures the frequency of the pulses and determines the speed of the rotary machine 10. Circuits 25, 26 replace the present mechanicoelectrical arrangements for tachymetric monitoring, such as tachometer generators. The working-hour chain comprises a wave shaping circuit 27, counter 28, and selective counter 29. Working-hour wave-shaping circuit 27 is also connected to the output of alternator 21 and provides at its output rectangular pulses. A counter 28 is connected to wave-shaping circuit 27 for counting and recording the number of working hours of rotary machine 10. A selective counter 29 is connected both to working-hour counter 28 and to sensor 13, for determining and recording the durations of periods of abnormal operation.

The sequence selector chain comprises a wave-shaping circuit 30 and a sequence selector circuit 31 for actuating control devices 11 in sequence and automatically. A lead 32 to selector circuit 31 allows command signals to be applied externally thereto.

On the basis of the overall diagram of FIG. 1, the details of the construction of the various constituent parts will be hereinafter described.

The alternator 12 is a tachometer alternator driven by the rotary machine. The speed at which the alternator is driven is at a constant ratio, for example, 1/1 or ½ to the speed of the machine.

This alternator supplies both the operating power and an AC signal for supervision of the operation of the rotary machine 10.

The apparatus herein achieves the goal of providing a self-contained arrangement for monitoring and controlling the rotary machine during all stages of operation. In particular, the apparatus monitors and controls during the start-up stage. The accumulator 23 typically contains a 12-volt battery which supplies power to the control circuits at a voltage of 12 volts or 5 volts and a maximum current of 0.2 amperes by way of a conventional voltage regulator 22.

It should be noted that a transformer 60 is in practice provided between the alternator 12 and the battery 23.

The power provided by the alternator 12 is greater than that consumed by the circuits fed from the battery and the capacity of the battery 23, which may conveniently be of the order of 5 ampere-hours is generally sufficient to ensure continuity of supply during the starting period, so that the arrangement is self-contained. During idle periods the power consumption is very small and the capacity of the battery is sufficient to maintain the arrangement in an operative condition for 500 hours. If the rotary machine 10 is expected to be idle for extended periods, as is the case for diesel engines associated with emergency generator sets, a trickle-charging circuit for charging the battery from an external source supply may be provided.

The AC frequency of the voltage supplied by the alternator 12 is proportional to the speed of rotation of the rotary machine 10. This frequency in turn is utilized for supervision of the machine by digital pulse counting.

The electronic chains 101–105 (FIG. 3) forming the digital frequency dividers allow the counting to be carried out at frequency values appropriate to the type of supervision desired.

Figure 3:
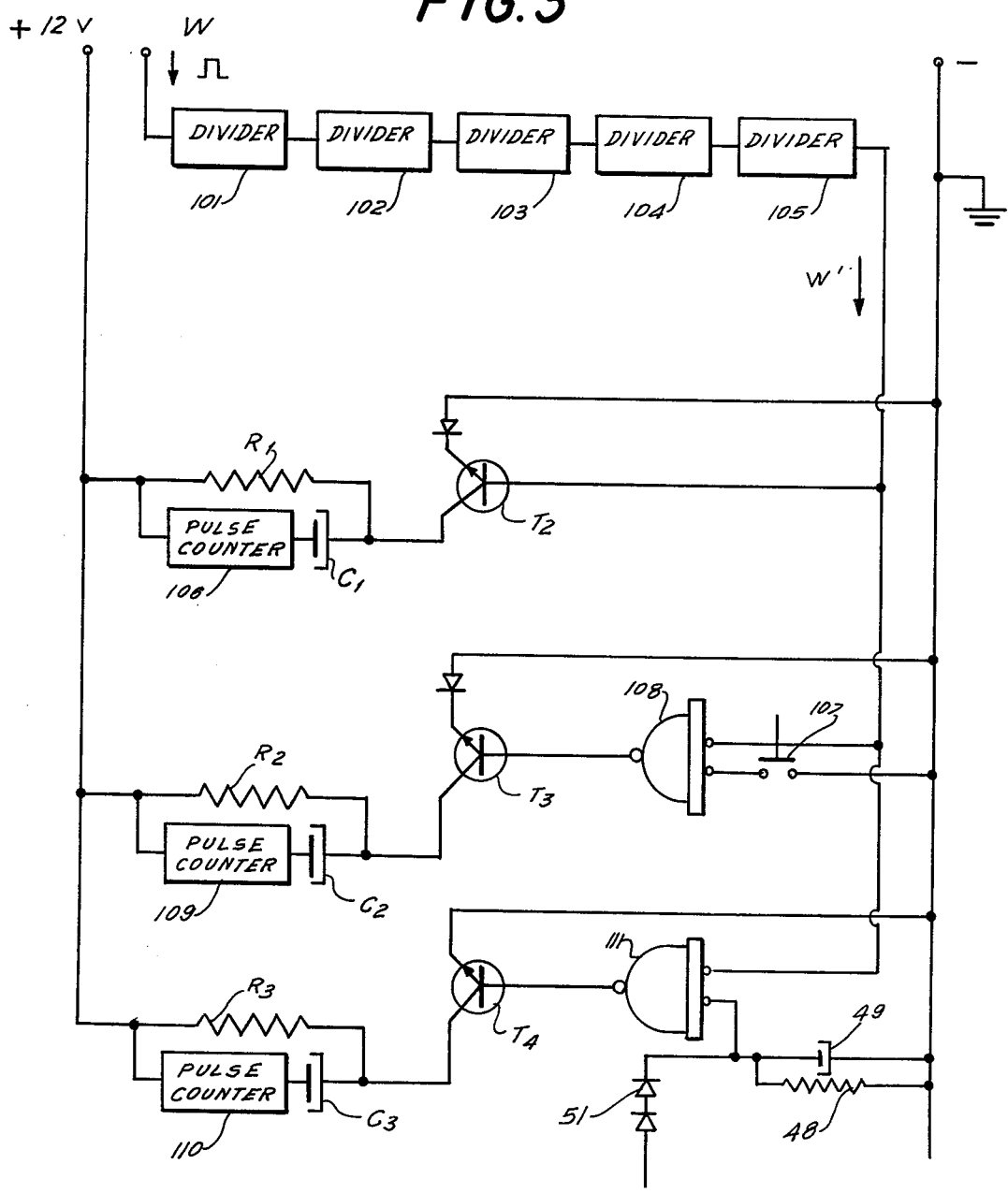
FIG. 3 is a simplified schematic circuit diagram showing the connection of the counter circuits for counting the number of rotations and for selective counting.

FIG. 3 represents schematically one embodiment of the tachymetric circuit chain 40 corresponding to circuits 26, 27 of FIG. 1.

The sinusoidal voltage supplied by the alternator 21 is received at terminal 41 and is peak-limited by a zener diode 42 connected in parallel with a resistance 43. The limited signal is applied to the base of a separating transistor $T_1$. The signal from the collector of the transistor is applied to the input of a Schmitt trigger 44. The output 45 of the trigger 44 is connected to the input of a monostable trigger 46. An output 47 of monostable trigger 46 is connected to a resistance 48 connected in parallel with a capacitor 49. A meter 50 connected across the terminals of the capacitor 49 measures the value of the current flowing in the resistor 48, which is proportional to the instantaneous speed of the rotary machine 10. In order to obtain zero current during periods when the speed is zero, the small load due to the low residual output voltage is compensated by two diodes 51 of which the forward voltage drop is 0.8 V.

Tachymetric chain 40 functions to provide pulses whose frequency corresponds to the AC frequency of alternator 12. The sinusoidal voltage of alternator 12 must be shaped into rectangular pulses. The AC voltage supplied by alternator 12 is peak-limited by zener diode 42 and resistor 43 to reduce its maximum value to a level compatible with the electronic counting circuits. The limited voltage is transformed by Schmitt trigger circuit 44 to a signal having a steep leading edge whenever the limited voltage exceeds a threshold level. The duration (and the frequency) of the output of the Schmitt trigger 44 varies with frequency of alternator 12. The output of Schmitt trigger 44 is formed into a pulse signal W by monostable trigger circuit 46. The duration of the pulses W is made independent of the alternator frequency. The monostable trigger circuit 46 should be designed so that the pulse duration is less than the duration of one half-cycle of the alternator output voltage when machine 10 is operating at its maximum speed. The frequency of the pulses leaving the monostable trigger may be measured, for example, by connecting the trigger output of a resistance connected in parallel with a capacitor. The DC voltage across the capacitor takes up a mean value which is the integrated value of all the pulses in a given time. By measuring the mean current in the resistance with a milliammeter a reading is obtained that is directly proportional to the instantaneous speed.

FIG. 3 shows a schematic circuit diagram of the working-hour recording chain 27, 28, 29 of FIG. 1, which is the circuit elements for counting the running hours.

Figure 2:
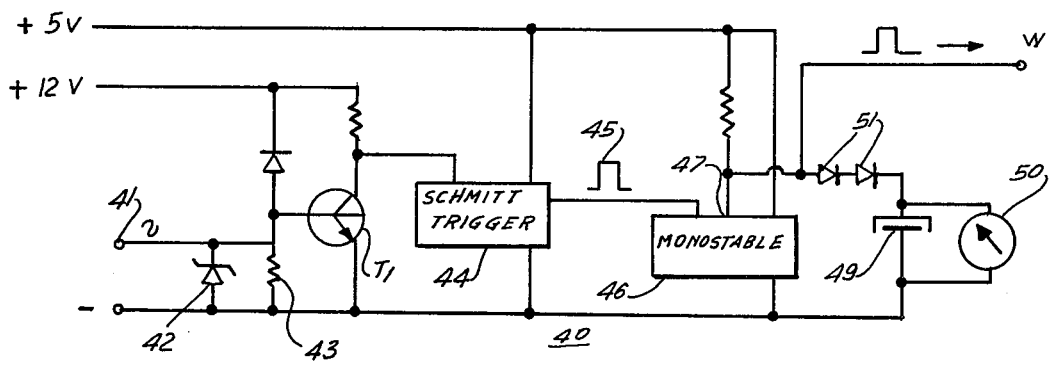
FIG. 2 is a simplified schematic circuit diagram of the signal shaping and tachometer indicator circuits.

Circuits 28 and 29 are preceded by shaping circuits 27 for forming rectangular signals. These circuits correspond to circuits T1, 44 and 46 of FIG. 2.

The pulses W from the monostable trigger 46 are applied to cascade-connected frequency dividers, comprising for example five dividers 101-105 which divide the frequency respectively by 3, 6, 6, 10 and 10, giving in all a division by a factor of 10,800.

For an alternator providing a frequency of 300 Hz at 1500 r.p.m., or 1,080,000 cycles per hour, each pulse W' at the output of the divider chain corresponds to 1/100th of a running hour under normal conditions.

The output of the divider chain is connected to a decade pulse counter 106 by way of a transistor T2 connected as a switch.

The output of the transistor is connected to a high-capacitance capacitor $C_1$ connected in series with pulse counter 106. The capacitor $C_1$ and the counter 106 are shunted by a resistor R1 of sufficiently high resistance that the discharge of the capacitor by way of the resistor is slow and does not trigger the pulse counter. The interval between pulses W' from the last divider stage is of the order of 30 seconds, and the capacitor has time to become discharged between two successive pulses. This arrangement of the counter limits the power consumption and allows the use of a dry battery and of a small, permanent-magnet alternator. This part of the circuit, which corresponds to counter 28 of FIG. 1, allows recording of the number of hours of normal running, or the number of rotations of the rotary machine. By using 6 digit counters, each division of which denotes 0.01 running hours or 10,800 rotations, a recording of up to 10,000 running hours may be made.

The counter 29 of FIG. 1 selectively records the number of hours or of operating rotations under certain conditions indicated by sensor 13. As shown in detail in FIG. 3, selective counter 29 comprises essentially a gate 108, for example a NAND gate with several inputs. As is known, a NAND gate is equivalent to an AND gate followed by an inverter, which provides a high output if at least one of its inputs is at a low level. The pulses W' from the frequency divider are applied to one of the inputs of the NAND gate 108 while another input is connected to the negative pole of the supply by way of a normally-closed contact 107 of a sensor responsive, for example, to the pressure or temperature of the oil or of the water.

The output of the NAND gate 108 is connected by way of a transistor T3 to the input of a pulse counter 109, connected in series with a capacitor C2, the series combination of capacitor and counter being shunted by a resistor R2. While the contact 107 is closed the output of NAND gate 108 is continuously at a high level and no pulse is recorded in the counter 109. When the operating conditions of the rotary machine become abnormal contact 107 opens and the counter 109 then records the pulses W' corresponding either to running hours or fractions of hours, or to a predetermined number of rotations of the machine while operating in an abnormal condition. The arrangement may also include several gates 108 and counters 109 with sensors 13, each counter thus recording the running time in the respective abnormal condition corresponding to that sensor, for example, time of running with low oil pressure or with high cooling water temperature. In case of breakdown, the respective counter allows the reasons for the breakdown to be known.

It is also possible to record the times of running at a certain speed, for example running time at a speed above 1000 r.p.m. This is the case for example with counter 110, which is connected in series with a capacitor C3, the series combination of capacitor and counter being shunted by a resistor R3. The counter is connected, by way of a transistor T4, to the output of a NAND gate 111. One of the inputs of gate 111 is connected to the output of the frequency divider chain 101-105. The other input is connected to receive the signal developed across the integrating capacitor 49 of FIG. 2. While the charge on the capacitor is too low, that is, when the speed of the rotary machine 10 has not reached a predetermined threshold, the output of NAND gate 111 remains constant at a high level and counter 110 does not record. Counter 110 records only the operating hours (or rotations) during which the speed of rotary machine 10 exceeds the threshold speed.

By distinguishing between the totaliser counter recording all running hours and the counter recording running time at a speed higher than a threshold, the number of running hours at a speed below the said threshold can be readily determined.

It should be noted that it is merely necessary to use gates having more than two inputs, one fed with the output of the divider chain and the others with signals controlled by the appropriate sensors or circuits to obtain, for example, the number of running hours with low oil pressure at a speed above 1000 r.p.m.

The apparatus according to the present invention allows information to be obtained as to the speed of the machine with reference to two predetermined thresholds, information as to the number of running hours and information as to the operating conditions of the machine.

By combining the information by means of gates it is thus easy to record, at low cost, the many items of selective information useful in determining the primary cause of a breakdown.

NAND gates shown in FIG. 3 are commercially available as TTL (transistor-transistor logic) integrated circuits. The NAND gates may obviously be replaced by other gates fulfilling the same logic functions, for example OR gates or AND gates.

The sequence selector chain 30, 31 of FIG. 1 provides sequential control for automation and/or for signalling. The practical embodiments of these circuits will vary with the type of rotary machine.

In the case of supervision of a heat engine, for example, the circuits should be arranged to take into account that the same condition of a sensor, for example the oil pressure sensor, has a totally different significance dependent upon whether or not the engine is running.

The sequential control circuits 30, 31 allow the automatic and sequential control at desired instants of all the operations for starting the motor and then of automatically commanding either an emergency stop while indicating the fault which has necessitated this stop, for a normal stopping of the motor.

The apparatus according to the present invention allows the counting of pulses taken from different pulse dividers 101-105, commencing with the starting of the motor, and thus permits the obtaining of a succession of control signals corresponding to a single phase of operation. This allows the automatic starting sequences to be performed without risk of incorrect operation. A succession of control signals providing for the automatic stopping of the rotary machine can likewise be provided.

It will be understood that the various elements of the circuits that have been described may be replaced by equivalent circuits, fulfilling the same function, and well known in the electronics field, without departing from the scope of the invention as defined by the appended claims.

I claim as my invention:

1. A rotary machine supervisory and/or control apparatus comprising low power alternator means, having an output, and being driven by the rotary machine for supplying alternating current at said output, electronic signal shaping circuit means connected to said alternator means output for converting the waves of the alternating current supplied by the alternator means into rectangular pulses, electronic pulse counter means for counting and recording said pulses during predetermined periods, and rectifier means connected to said alternator means output for supplying a low voltage direct current to all the electronic components of the apparatus.

2. A rotary machine control apparatus according to claim 1 including automatic control means for controlling the sequence of operations of starting and normal stopping, and sequence selector circuit means, including frequency dividers and pulse counters, connected to the output of said shaping circuit means, said pulse counter means counting a determined number of pulses from the starting or stopping orders of said control means and triggering said automatic control means in sequence, after a determined number of rotations of the rotary machine.

3. A rotary machine supervisory apparatus comprising:
   low power alternator means having an output and being driven by the rotary machine for supplying an alternating current at said output;
   electronic signal shaping circuit means connected to said alternator means output for converting the waves of said alternating current into rectangular pulses supplied at an output of said shaping circuit means;
   at least one sensor means positioned on said rotary machine for automatically actuating an electric contact whenever a predetermined operating condition of said machine occurs;
   at least one electronic pulse counter;
   at least one electronic logic gate having a plurality of inputs and one output, said output of said shaping circuit means being connected to a first input of said logic gate, with the other inputs of said logic gate being respectively connected to said sensor means actuated electric contact, and said output of said logic gate being connected to said pulse counter for recording, when said gate is open, a number of pulses corresponding to the number of rotations of the machine under operating conditions determined by said sensors,
   and rectifier means connected to said alternator means output for supplying a low voltage direct current to all the electronic components of the apparatus.

4. A rotary machine supervisory and control apparatus as claimed in claim 3 including in combination:
   first pulse counter means connected through frequency dividers to the output of said shaping circuit means for recording the total number of rotations of the rotary machine;
   second electronic pulse counter means connected through first logic gates to said sensor means and to the output of said shaping circuit means for recording the number of rotations of the machine under operating conditions determined by said sensor means;
   third electronic pulse counter means connected through second logic gates to the output of said shaping signal means and to the output of integrator circuits connected to the output of said shaping circuit means for recording the number of rotations of the machine whenever said machine exceeds a predetermined speed; wherein all the electronic components are fed, in normal operations, with direct current supplied by said rectifier means connected to the output of said alternator means, and during the starting phase of the rotary machine with direct current supplied by a battery charged during normal operations by said rectifier.

5. A rotary machine supervisory apparatus comprising:
   low power alternator means having an output and being driven by the rotary machine for supplying an alternating current at said output,
   electronic signal shaping circuit means connected to said alternator means output for converting the waves of said alternating current into rectangular pulses of constant duration supplied to the output of said shaping circuit means;
   an electronic pulse counter;
   an integrator circuit connected to the output of said shaping circuit means and having an output which supplies a voltage proportional to the speed of the rotary machine;
   an electronic logic gate having two inputs and one output, said output of said shaping circuit means being connected, through a frequency divider, to a first input of said electronic gate; said output of said integrator circuit being connected to a second input of said electronic gate and said output pulse counter which records, when the gate is open, a number of pulses corresponding to the number of rotations of the machine at a speed exceeding a predetermined value;
   and rectifier means connected to said alternator means output for supplying a low voltage direct current to all the electronic components of the apparatus.

6. A rotary machine supervisory apparatus according to claim 5 wherein said electronic signal shaping circuit means comprise a Schmitt trigger having an input connected to the output of said alternator means and a monostable trigger having an input connected to the output of said Schmitt trigger.

* * * * *